United States Patent [19]

Garfield

[11] Patent Number: 4,558,718
[45] Date of Patent: Dec. 17, 1985

[54] FORCED AIR DUCTING FLOW CONTROL VALVE

[76] Inventor: James R. Garfield, 2700 Balmoral Ct., Fort Collins, Colo. 80525

[21] Appl. No.: 431,726

[22] Filed: Jun. 3, 1983

[51] Int. Cl.$^4$ .................................... F16K 31/126
[52] U.S. Cl. .......................... 137/614.11; 251/62; 92/53
[58] Field of Search ............ 251/62, 63.4; 137/601, 137/614.11, 614.18, 614.19; 236/49; 92/53

[56] References Cited

U.S. PATENT DOCUMENTS

| | | | |
|---|---|---|---|
| 1,095,926 | 5/1914 | Powell | 92/53 |
| 1,685,697 | 9/1928 | Guerin | 92/53 |
| 2,416,796 | 3/1947 | Dobbs | 92/53 X |
| 3,117,723 | 1/1964 | Church | 236/49 |
| 3,150,571 | 9/1964 | Frassetto et al. | 92/53 X |
| 3,900,299 | 8/1975 | Spehrley | 137/601 X |
| 3,942,552 | 3/1976 | Logsdon | 236/49 X |
| 4,235,256 | 11/1980 | Crawshay | 251/62 X |

Primary Examiner—A. Michael Chambers
Assistant Examiner—John C. Fox

[57] ABSTRACT

A device for controlling air or heat flow within an air passageway ducting, or other air passageways, having low cost, high efficiency and easily installed, is in the form of a Force Air Ducting Flow Control Valve. The valve has a rubber or synthetic rubber bladder, controlled by a telescoping piston, which, using compressed air from an outside source, moves the bladder across the air passageway and causes the bladder to fill with compressed air and expand until constrained by an outer metal or plastic air permeable case, thus forming an efficient obstruction in the air passageway on two sides of the bladder. Between the bladder and the outer case is a blanket of flexible material, preferably an insulator such as "space blanket," which is attached, in the middle to the end of the bladder and on the ends to spring loaded cylinders in such a way, as to protect and insulate the bladder when it is against the case, and to provide pressure to move the bladder and telescoping piston from causing an obstruction in the air passageway, when the air pressure within the bladder and telescoping piston is equal to atmospheric pressure.

14 Claims, 4 Drawing Figures

FORCED AIR DUCTING FLOW CONTROL VALVE

The present invention relates to the control of air and heat flow within an air passageway ducting or other air passageway, as in the heat and cooling systems of residential and commercial buildings, or specifically in an air passageway of an active solar heating system.

The efficient use of fuel in the heating and cooling of habitats and working areas demands designers to incorporate complex air and heat control programs. One such method of regulation is the installation of flow control valves within air passageway ducting. Flow control valves allow separate areas served by one heating or cooling source to be adjusted to varying time needs.

In the past, flow control valves have been made of sheet metal or like material and shaped like flappers or movable louvers. They are powered manually or by electricity. The inconvenience, expense, or low efficiency of such a design has limited its application to key distribution points and places easily accessible.

Active solar heating systems were developed to replace conventional fuels in the heat of habitats and working areas. The industry has been sluggish due to high initial investment and the inexperience of tradesmen installing different systems. There are two methods currently used to distribute solar heat within the active system. One requires the circulation of a fluid through tubing and is inherently expensive because of the extensive plumbing required. The other requires the circulation of air through ducting and is also inherently expensive due to the extensive specialized sheet-metal work required. The active air system is also vulnerable to losses of stored heat traveling through traditional flow control valves. Preventing losses of these kinds in active air solar heating systems requires an insulated air tight valve which has been expensive to make, hard to install, and difficult to maintain.

Accordingly it is the object of the present invention to provide a standardized, low cost, flow control valve, which can be mass produced using state of the art techniques, thus facilitating the specific demand needs of different use areas of buildings and the multiple uses encountered in an active air solar heating system.

Another object of the present invention is to provide a relatively air tight flow control valve which is functional over a period of time, thus facilitating greater control of air movement within air passageways.

Another object of the present invention is to provide a flow control valve which is powered by a source distant from it.

Another object of the present invention is to provide a system of multiple flow control valves which operates from the same power source thereby lowering maintenance and installation costs.

Another object of the present invention is to provide a flow control valve which is easily installed as a package unit and doesn't require extensive trade experience.

A further object of the present invention is to provide a flow control valve which, when closed, will be insulated against heat loss traveling through it.

In accomplishing the foregoing objects, there has been provided, according to an embodiment of the invention, a flow control valve which includes an outer plastic or metal case which is air permeable on the sides perpendicular to and facing the air passageway being controlled and air impermeable on all other sides, with the exception of one side parallel to the air passageway, which is open. In a preferred embodiment of the invention the outer case is made air permeable by implementing a gridwork of square openings on the face of the case where the approximate dimensions of the total gridwork are the cross section of the air passageway. In a preferred embodiment of the invention that side of the case which is open is extended past the cross sectional dimension of the air passageway so the inner workings of the valve are housed outside the air passageway. In a preferred embodiment of the invention the sides perpendicular to the air permeable sides are extended past the surface of the air permeable sides so they might form a collar to accommodate the air passageway ductwork and aid in ease of installation. Included within the outer case is a blanket of flexible material, preferably cloth or synthetic cloth, metal, plastic, or any combination thereof. In a preferred embodiment of the invention the size of the blanket is three times one cross sectional dimension of the air passageway by the dimension of the other cross section of the air passageway in such a way that the shorter dimension coincides with a parallel dimension of the open side of the outer case. The shorter ends of the blanket are connected to spring loaded cylinders made from wood, metal, or plastic in such a way as to resemble a scroll. The cylinders are in turn connected to the open side of the outer case in such a way as to be perpendicular to the air passageway and on opposite sides of the opening. In a preferred embodiment of the invention the blanket is made of an insulating materials such as "space blanket." Included within the blanket of flexible material is a natural or synthetic rubber bladder. The outer dimension of the bladder is the approximate dimension of the inner surface of the outer case, being a fraction smaller to accommodate movement within the outer case. The only opening in the bladder is the one corresponding to the side of the case which is open. In a preferred embodiment of the invention the bladder is molded, when manufactured, in an accordian like fashion on the sides corresponding to the air permeable sides of the outer case for ease in operation of the valve. In another preferred embodiment of the invention, that side of the bladder which is open has a flange molded with it to form a gasket for ease of assembly. Included within the bladder are a series of telescoping pistons made from metal, plastic, and natural or synthetic rubber. Each piston, with the exception of the smallest, is open on two opposite sides, while the other sides are air impermeable and closed. The outer surfaces of the closed sides of the largest piston are smaller in dimensions than the inner surface dimensions of the bladder. When fully extended or telescoped, the total distance of the assembly is equal to the distance from the open side of the outer case to the side opposite it. The smallest piston is open on one side only, that side which corresponds with the open sides of the other pistons. On one outer side, of the smallest piston, opposite the open side, there is attached a piston bar for durability in operation and to provide a full seating of the bladder. In a preferred embodiment of the invention the piston bar is attached to the smallest piston with screws for ease of assembly. The number of pistons and the depth of each piston is determined by the distance between the open side of the case and the side opposite it. The depth of the piston should not be so great as to interefere with airflow within the air passageway when the valve is open but should be as large as possible to eliminate unneeded pistons. The number of pistons required is the distance of the open side of the outer case to the side opposite devided by the depth of the piston. The pistons are so constructed, in the dimension of the closed sides, so the pistons, in succession, fit inside one another with a minimum opening between the outer closed surface of the inner piston and the inner closed surface of the outer piston so that ease of the telescoping action is assured while a minimum of air escapes between the two surfaces. If the two surfaces account for a large loss of air, so as to make the valve inoperable, an air seal must be incoporated to the surface of one of the closed sides. In a preferred embodiment of the invention, o-rings are mounted upon the outer surface of the inner piston in such a way as to insure a seal when the piston assembly is extended. As the smaller pistons telescope out, and the piston assembly extends, they must pull the next larger piston with them. In a preferred embodiment of the invention a lip is molded into the piston so that, when a piston is telescoped so far, the lip on the outer surface of the closed side of the smaller piston locks with the lip on the inner surface of the closed side of the larger piston, thus pulling it in a telescoping fashion. In a preferred embodiment of the invention a flange is molded to the closed side of the largest piston, opposite the side with the inner lip, for ease of assembly. In a preferred embodiment of the invention the shape of the closed sides of the piston resembles a rectangle and the largest piston is the largest dimension possible thereby making the dimension of the smallest piston the largest possible. Therefore the inner face of the face opposite the open side of the smallest piston is the largest, thus the power of the piston assembly is the greatest. Included in an embodiment of the invention is the requirement the piston assembly be located inside the bladder, both being sealed on their respective open ends to form an air tight chamber, the only opening of which is a compressed gas line. In a preferred embodiment of the invention the piston assembly is placed within the bladder, and the flange of the largest piston coincides with the flange of the bladder. The opposite side of the bladder flange coincides to the manifold housing. The opposite side of the largest piston flange coincides with a rubber gasket which coincides with a cover plate on its opposite side. The only opening in the cover plate is through the compressed gas line connection attached. Thereby screws extending through the cover plate, gasket, piston assembly, bladder and attached, with pressure, to the manifold form an air tight chamber within the bladder. The manifold is made of metal or plastic and allows the piston assembly and bladder to pass through it while maintaining an air tight chamber within the bladder. The manifold assembly also attaches the cover plate, piston assembly, and bladder to the outer case. The manifold is designed so the blanket of flexible material can move between it and the outer case, on both sides of the open side of the case, where the spring loaded cylinders are attached. Included in an embodiment of the invention, the middle of the blanket is attached to the end of the bladder, opposite the side of the bladder which is open, the bladder being inside the blanket. In turn the end of the bladder is attached to the piston bar which is inside the bladder. In a preferred embodiment to the invention the proceeding is accomplished by means of the combination bladder guide piston bar blamp. The clamp is placed over the blanket securing the blanket to the bladder and the bladder to the piston bar by way of a clamping pressure exerted by screws. The bar clamp also serves as a bladder guide which, when the bladder is powered across the inner surface of the outer case, is not damaged by friction against it.

The Forced Air Duct Flow Control Valve is operated by compressed gas, as a power source located outside the valve. In a preferred embodiment of the invention the valve is operated by compressed air. Compressed air enters the valve through the connection on the cover plate. The compressed air powers the pistons in a telescoping action across the inner dimension of the outer case. The piston assembly in turn pulls the bladder with it. The piston assembly in turn pulls the blanket which is in turn pulled on spring loaded cylinders. The piston assembly has minimum air leakage. After it has traveled the distance from the open side to the opposite side of the outer case, it fills the bladder surrounding it with compressed air which expands to be constrained against the inner faces of the outer case. Between the bladder and the outer case, the blanket protects the bladder from damage the case might inflict and provides containment for the bladder and protects it from over expanding on the surfaces of the outer case which are air permeable. In a preferred embodiment of the invention the blanket is made of an insulating material such as "space blanket" which insulates the valve against heat flow through it. When the bladder is fully inflated to a predetermined pressure, the valve forms an efficient obstruction to air and heat flow within the air passageway. When an obstruction is no longer needed in the air passageway the compressed air within the valve is vented outside. At this time, the bladder collapses and the assembly is pulled back across the dimensions of the inner surface faces of the outer case by the spring action of the spring loaded cylinders pulling on the blanket of flexible material. Thus the obstruction within the air passageway is eliminated. Thereby, air and heat can travel within the air passageway.

Using an outside power source, a system of multiple valves, working from a central control will open or close, by pressurizing or by venting, any combination of flow control valves as the need occurs.

Other objects, advantages and capabilities of the present invention will become more apparent as the description proceeds, taken in conjunction with the accompanying drawings in which like parts have similar reference numbers and in which.

Figure 1:
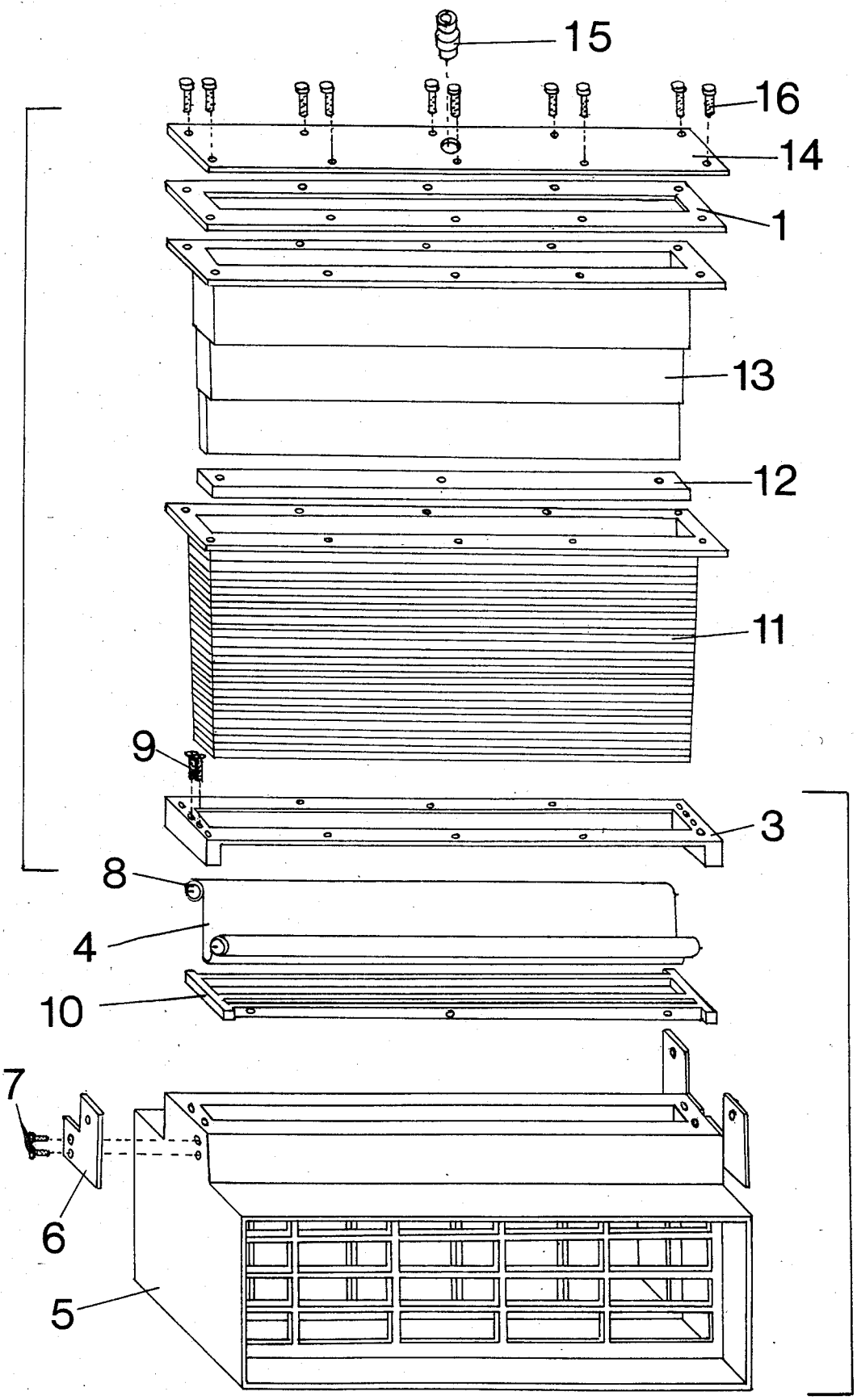
FIG. 1 is an exploded perspective view of the flow control valve of the present invention.
Figure 2:
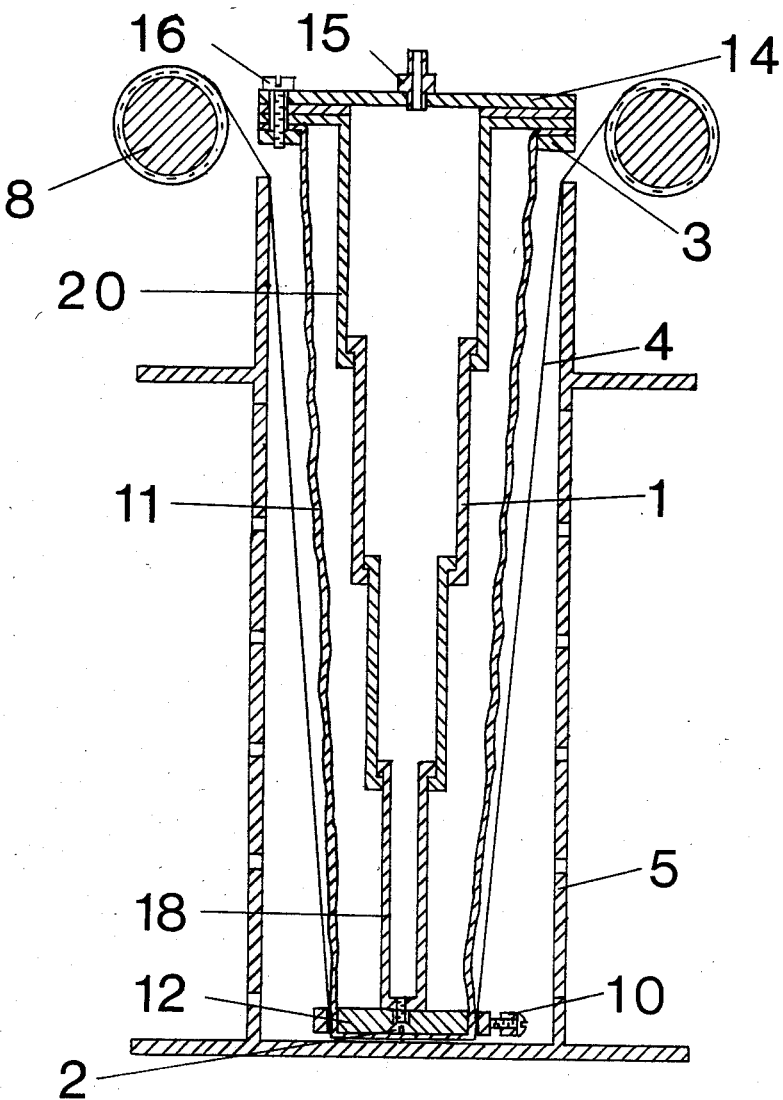
FIG. 2 is a vertical sectional of the flow control valve of the present invention.

Referring now to the drawings, FIGS. 1-2, show component parts of the Forced Air Ducting Flow Control Valve. In a preferred embodiment of the invention the valve is rectangular in shape. The flow control valve can be any shape as long as the coinciding shape of the inner workings can insure an efficient seal.

Numeral 1. Represents a rubber gasket. The gasket accomplishes an airtight seal between the piston assembly flange and the cover plate. The material of the gasket should, under compression, be capable of sealing against leakage in a working range of 3 to 20 p.s.i. Materials other than natural rubber are capable of achieving such a seal. They include synthetic elastomers and wet plastics. Numeral 2. Represents the piston bar which attaches on the side opposite the open side of the smallest piston. In a preferred embodiment of the invention, the bar is attached to the smallest piston by screws. Numeral 3. Represents the manifold which secures the cover plate, piston assembly, and bladder to form an airtight chamber within the bladder and cover plate. The manifold also secures the previous assembly to the open side of the outer case. The manifold should be a rigid material to accomodate the working stresses of 3 to 20 p.s.i. gas pressure. Wood, steel or plastics are recommended materials. Numeral 4. Represents the blanket of flexible material. The blanket is made of synthetic or real cloth, plastic or metal or a combination, in such a way as to provide flexibility and durability. A preferred embodiment of the invention is a combination of all three materials, in layered form, to provide an insulating blanket which retards heat flow through the valve. Numeral 5. Represents the outer case. The function of the outer case is to house the working components of the valve. It must be sturdy enough to withstand the pressures generated on all sides by a working pressure of 3 to 20 p.s.i. The case is made of metal or plastic. Numeral 6. Represents the cylinder mounting brackets. The function of the brackets is to secure the spring loaded cylinders to the open side of the outer case. The shape of the brackets varies to accommodate the shape of the outer case. A metal or plastic material is used to make the brackets. Numeral 7. Represents the cylinder mounting bracket screws which secure the cylinder mounting brackets to the outer case. The number and size of which are determined by the design of the bracket. If the brackets are plastic, they could be cemented to the outer case in lieu of using screws. Numeral 8. Represents the spring loaded cylinder. The function of the spring loading is to roll the blanket of flexible material upon the cylinders, thus providing power to open the valve. The spring is located within the cylinder and is capable of drawing the piston assembly and bladder to the open side of the outer case. The cylinders are firmly attached to the two opposite short ends of the blanket. The cylinders are made of wood, plastic, or metal. The spring is metal. Numeral 9. Represents the manifold assembly screws. The manifold assembly screws are capable of withstanding 3 to 20 p.s.i. working pressure on the manifold. The number of screws is determined by the design of the outer case and manifold. Numeral 10. Represents the bladder guide and piston bar clamp. The function of which is to secure the blanket to the bladder and the bladder to the piston bar. Its configuration is dependent upon the design of the three components. It is made of plastic, metal or a combination of the two. A preferred embodiment of the invention allows for ears on each end of the clamp which act as guides for the piston assembly and bladder. The ears are guided by the inner surface of the outer case. Numeral 11. Represents the rubber bladder. The function of the bladder is to maintain an airtight chamber throughout the opening and closing of the valve. When the valve is closed, the bladder expands with gas pressure and is constrained against the permeable and impermeable sides of the outer case thus forming an efficient obstruction. The configuration of the bladder is dependent upon the configuration of the inner faces of the outer case so that an efficient seal be made when the valve is closed. In a preferred embodiment of the invention, the bladder is molded to resemble an accordian shape thus allowing ease of movement across the inner face of the outer case. The bladder has a flange molded on the open end to aid in assembly in forming an airtight chamber. The bladder is made of real or synthetic rubber. Numeral 12. Represents the piston bar. The function of the piston bar is to assure full movement of the bladder throughout the telescoping of the piston assembly. The configuration of the piston bar is dependent upon the configuration of the end of the bladder opposite the open end. The piston bar is made of metal or plastic. Numeral 13. Represents the piston assembly. The function of the piston assembly is to provide mechanical force from compressed gas force. The piston assembly telescopes from the open face of the outer case to the side opposite it. The telescoping action is used to save space in the valve assembly. The piston assembly pulls the bladder and blanket to the opposite side. When the opposite side is reached, air escaping from the piston fills the bladder, which expands to the outer case. The configuration of the piston is determined by the amount of work to do and the distance the piston assembly must travel. The pistons are made of plastic or metal.

Figure 3:
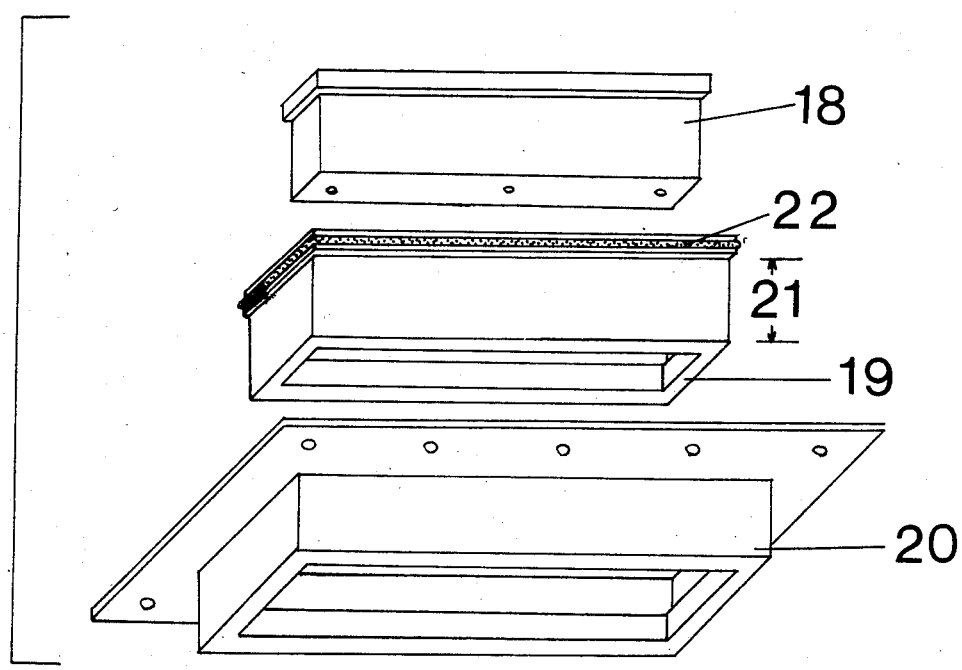
FIG. 3 is an exploded perspective view of the piston assembly represented by Numeral 13 in FIGS. 1-2.

Referring now to the drawing FIG. 3, Numeral 18 represents the smallest piston where the side opposite the open side accommodates a piston bar. Numeral 19. Represents the middle pistons which fit inside each other. The lips on the inner surfaces of the closed sides and on the outer surfaces of the closed sides lock, and the smaller piston pulls the larger piston when the piston assembly is telescoping. Numeral 20. Represents the largest piston. In an embodiment of the invention, a flange is molded on the closed end opposite the end with the lip. Numeral 21. Represents the depth dimension measurement of the piston. Total distance traveled by the piston assembly divided by the required depth of the piston determines the number of pistons in the piston assembly. Numeral 22. Represents the o-ring which may be required if the air seal of the pistons isn't great enough and, without it, makes the valve inoperable.

Referring once again to the drawings FIGS. 1 to 2, Numeral 14. Represents the cover plate which seals the open end of the bladder and piston assembly and forms an airtight chamber within the bladder. The cover plate is capable of withstanding a working pressure of 3 to 20 p.s.i. The cover plate is made of plastic or metal. Numeral 15. Represents the compressed gas line connection. The function of the connection is to let compressed gas into the airtight chamber when the valve is closing and to vent compressed gas to atmospheric pressure from the airtight chamber when the valve is opening. The connection is made of metal or plastic. In one embodiment of the invention, the connection is molded into the cover plate. Numeral 16. Represents the cover plate screws. The function of the cover plate screws is to secure the cover plate, gasket, piston assembly, and rubber bladder to the manifold to form an airtight chamber within the bladder. The number of screws needed is dependent upon the working pressure of the valve and the design of the manifold. The screws are made of metal or plastic.

Figure 4:
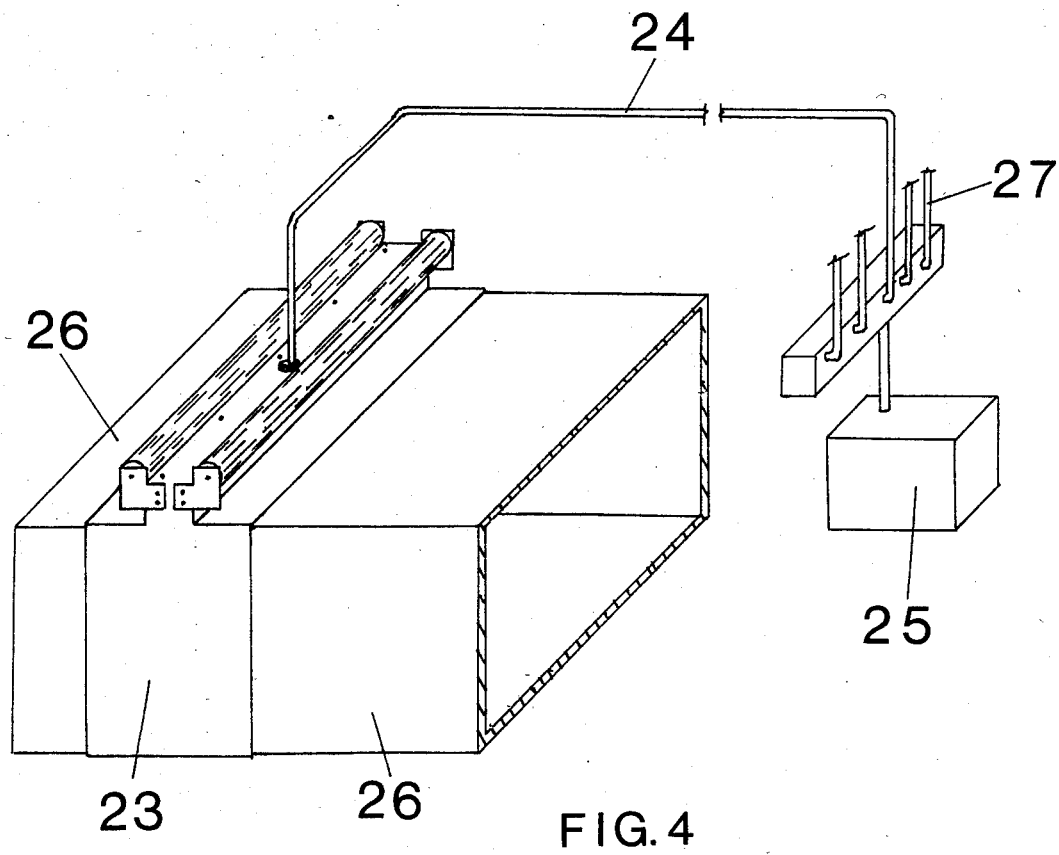
FIG. 4 is a perspective view which schematically shows how the flow control valve can be incorporated within air passageway ducting.

Referring now to the drawing FIG. 4, Numeral 23 is the Forced Air Ducting Flow Control Valve in a preferred embodiment of the invention, installed in rectangular ducting. The collars of the outer case accommodate the air passageway ducting. Numeral 24. Represents the compressed gas line to be traveling to an outside power source. The function of the tube is to supply the valve with compressed gas or to vent the valve to atmospheric pressure. The line is made of plastic or metal. Numeral 25. Represents the control box. The function of the control box is to supply the valve with compressed gas or to vent the valve to atmospheric pressure. Numeral 26. Represents the forced air passageway ducting. Numeral 27. Represents multiple compressed gas tubes, which are connected to other valves. The multitude of valves can be controlled from one location and power source. Numeral 28. Represents the power source of the flow control valve. A compressor is charging a tank with compressed gas to a specific p.s.i. The storage capacity of the tank is determined by the size and the number of valves and the corresponding requirements for a supply of compressed gas.

Since those skilled in the art will readily perceive various modifications, the appended claims are to be construed to cover all equivalents falling within the scope and spirit of the invention.

I claim:

1. A forced air ducting flow control valve comprising:

an outer case of sufficient inner dimension to house components of said flow control valve, where two opposite sides of said outer case, are air permeable and form an air passageway through said outer case perpendicular to said air permeable sides, where one remaining side parallel to said air passageway, is open, where all other sides of said outer case are air impermeable and closed;

and a blanket of flexible material comprising four edges and a middle, those edges corresponding to an edge of said open side of said outer case which is perpendicular to said air passageway are attached to spring loaded cylinders in a scroll-like fashion and roll upon the cylinders, where said cylinders are attached by their respective ends opposite each other on said open side of said outer case so as to be perpendicular to said air passageway, where said cylinders are free to roll said blanket upon them when attached to said outer case, where spring loading in said cylinders supplies enough pressure to roll said blanket upon said cylinders and pull said valve to an open position when said valve is opening;

and a rubber bladder having an inner and outer dimension, where said outer dimension is approximately equal to the inner dimension of said outer case, where one side of said bladder is open, that side corresponding to said open side of said outer case, where all other sides of said bladder are closed and air impermeable, where said bladder fits inside said outer case with said blanket fitting between said bladder and said outer case;

and a telescoping piston assembly comprising at least two pistons, each having an outer dimension, where the outer dimension of the first piston is less than the inner dimension of said bladder, where the extended length of said piston assembly is equal to the distance from said open side of said outer case to the side opposite it, where said piston assembly powers, by way of compressed gas, the closing of said valve by pulling said bladder and blanket across the inner dimension of said outer case in a way parallel to said permeable sides of said outer case, where air escaping from said piston assembly fills said bladder which expands, to be constrained by said outer case to form an efficient obstruction in said air passageway;

and a piston bar where full movement of said bladder is assured when powered by said piston assembly to an extended position, where said piston bar is attached to the last piston in said piston assembly;

and a bladder guide piston bar clamp which attaches the middle of said blanket to that closed side opposite said open side of said bladder and attaches said closed side of said bladder to said piston bar so that said piston bar is inside said bladder which is within said blanket;

and a cover plate where a surface of dimension is at least equal to the dimension of the open end of said bladder, where a compressed gas connection allows an air passageway through said surface;

and a manifold assembly, where said bladder and said piston assembly are free to travel through said manifold, where said cover plate, said piston assembly, and said bladder are attached to said manifold to form an airtight chamber, where said airtight chamber is attached by way of said manifold to said open side of said outer case, where said blanket is free to travel between said manifold and said outer case.

2. A flow control valve as defined in claim 1 in which said outer case, blanket, spring loaded cylinders, bladder, piston assembly, piston bar, cover plate, and manifold are of sufficient strength, made in any combination of plastic, metal, rubber, and wood, to operate at a working force of 3 to 20 p.s.i.

3. A flow control valve as defined in claim 1 in which the sides of said outer case, parallel with said air passageway are extended to form collars to accommodate said forced air ducting.

4. A flow control valve as defined in claim 1 in which the sides perpendicular to said open side of said outer case are extended past the face of said open side so said bladder and said piston assembly are housed outside said air passageway.

5. A flow control valve as defined in claim 1 in which said blanket of flexible material is insulated and retards heat flow through said valve.

6. A flow control valve as defined in claim 1 in which said bladder is molded, when manufactured, in an accordian like fashion for ease of movement in operation.

7. A flow control valve as defined in claim 1 in which a flange is molded in the opening of said bladder for ease of assembly.

8. A flow control valve as defined in claim 1 in which said largest piston has a flange molded with it for ease of assembly.

9. A flow control valve as defined in claim 1 where the inner face of the piston of said piston assembly has a lip molded on it and the outer face of said piston has a lip molded on it, in such a way, that when said piston assembly extends the lips lock and the smaller piston pulls the larger piston with it.

10. A flow control valve as defined in claim 1 in which the pistons in said piston assembly have o-rings on their outer surface to form a seal against large air loss.

11. A flow control valve as defined in claim 1 in which said bladder guide piston bar clamp has ears on each end which act as guides and are guided by the inner surfaces of said outer case.

12. A flow control valve as defined in claim 1 in which a gasket is housed between the piston assembly and cover plate for ease of assembly.

13. A flow control valve as defined in claim 1 in which said spring loaded cylinders are mounted upon said outer case with brackets.

14. A flow control valve as defined in claim 1 in which the sides of said outer case, of said pistons in said piston assembly, of said cover plate, of said blanket, and of said manifold are rectangular in shape.

* * * * *